United States Patent Office 3,248,823
Patented May 3, 1966

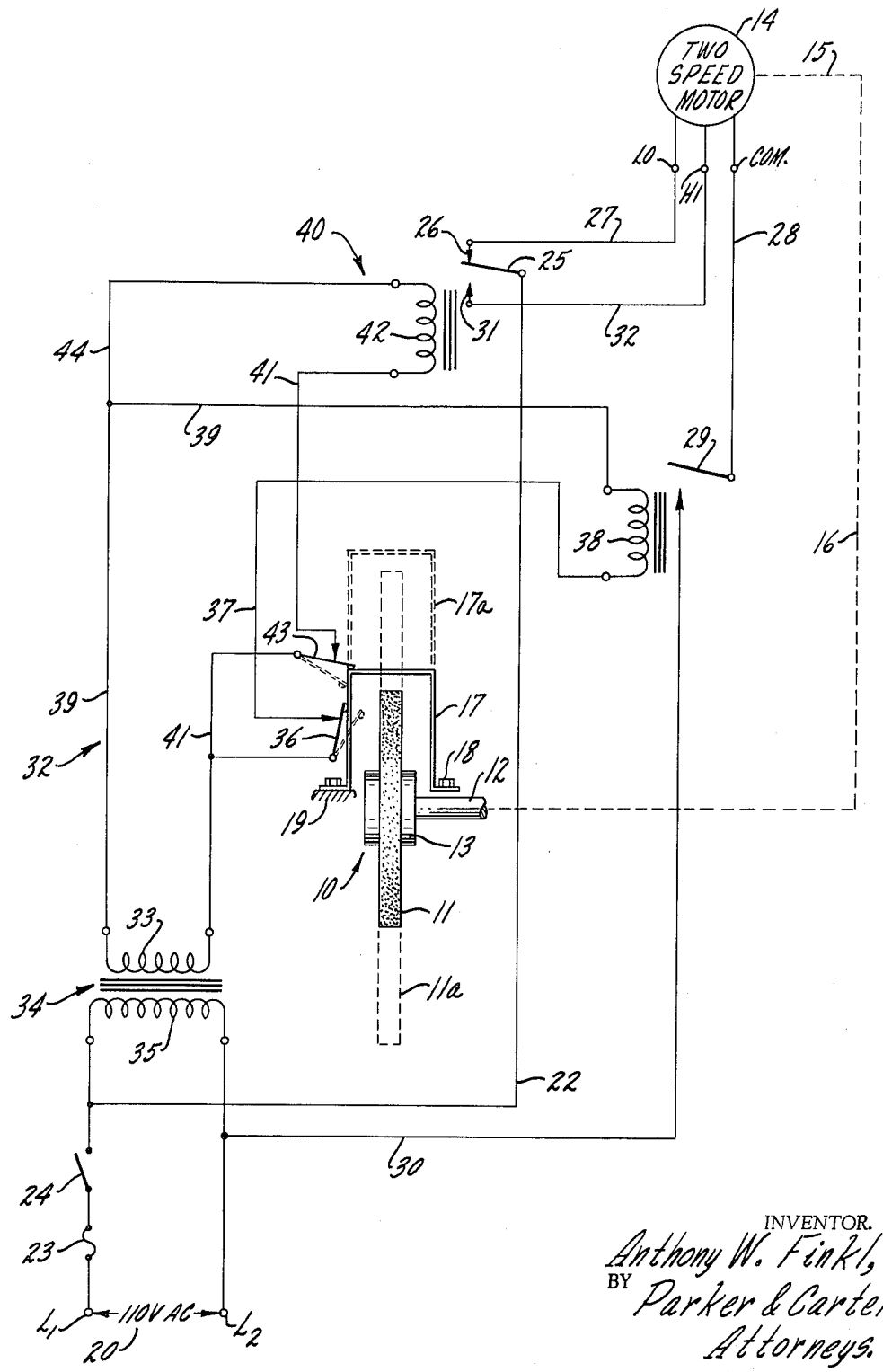

3,248,823
SPEED CONTROL SYSTEM FOR ABRASIVE WHEEL
Anthony W. Finkl, Chicago, Ill., assignor to A. Finkl & Sons Co., Chicago, Ill., a corporation of Illinois
Filed May 23, 1963, Ser. No. 282,640
9 Claims. (Cl. 51—134.5)

This invention relates generally to cut off wheels, and specifically to means for maintaining the peripheral speed of a cut off wheel below a safe maximum operating limit where a variable speed drive is concerned.

Cut off wheels have an optimum peripheral speed, or at least an optimum peripheral speed range, within which the grinding or cutting action of the wheel is most efficient and it is highly desirable that the wheel be operated at or close to that operating speed at all times. As a practical matter it is impossible to maintain the peripheral speed of the wheel at the optimum speed or speed range if the wheel r.p.m. is maintained constant. This is because of the diameter of the wheel wears down with use, particularly where the wheel is employed primarily as a cutting tool, such as an abrasive cut-off wheel or grinding wheel. As the wheel wears the peripheral speed decreases and optimum cutting efficiency falls off. This problem is especially acute with thin wheels used for cut-off of steel or other high strength metals.

The problem of maintenance of an optimum peripheral wheel speed can be cured by increasing the r.p.m. of the wheel as the diameter decreases from wear. In the prior art this has generally been done by increasing the speed of the wheel motor although other schemes such as varying the size of drive pulleys between the motor and the wheel have also been employed.

Equipping a wheel with a multiple or variable speed motor has serious drawbacks, however. If, for example, a new maximum diameter wheel is placed on a spindle and the wheel rotated at the rate of speed intended to be used with a wheel of smaller diameter, the wheel could physically break up from a centrifugal explosion resulting in injury to the operator and damage to the equipment. This is a constant danger because it is entirely possible for an operator to remove a worn, small diameter wheel, which has been turned at a maximum r.p.m., and install a new, maximum diameter wheel, and forget to correct the motor speed to compensate for the difference in wheel diameter. Specifically, where a cut-off wheel of a given diameter has been designed to operate at a safe peripheral speed for proper cutting efficiency and an operator, because of the nature of his work, decides to use a large diameter cutting wheel, he must perform two operations in addition to changing the cutting wheel. First of all a larger diameter guard must replace the previous guard to enclose the larger diameter cutting wheel. Secondly, the rotational speed of the cutting wheel must be reduced to maintain safe speed limits as well as correct cutting speeds for efficiency. This invention maintains the peripheral speed of the wheel within a safe speed even if the operator forgets the second step.

Accordingly, a primary object of this invention is to provide a system for preventing injury to the operator of a cut off wheel resulting from the physical breakup or centrifugal explosion of the wheel by means of a simple safety device which is effective to prevent excessively high rotational speed of the wheel.

Another object is to provide a safety system of maximum simplicity which prevents operation of a grinding wheel, cut-off wheel, radial saw, or other similar devices at a speed greater than the maximum safe rotational speed for any given wheel diameter.

Yet another object is to provide a system which prevents operation of a wheel at unsafe speeds independently of the action of the operator, thus completely eliminating the risk of human error.

Yet another object is to provide a simple system which prevents operation of a rotating wheel unless a wheel guard is in place.

Yet a further object is to provide a system which will stop rotation or reduce rotation to the lowest speed should failure occur in a circuit in either the main line of the motor or the motor speed control circuit.

Yet a further object is to provide a speed control system for a rotating wheel, particularly a thin abrasive cut-off wheel, which requires no complicated mechanical linkage, actuating screws or lever actions.

Yet a further object is to provide an electrical speed control system for rotating wheel which is positive in action and not subject to wear or lock-up from abrasive dust causing the controls to become inoperative.

Yet a further object is to provide a speed control system for a rotating wheel which may be easily adapted to A.C. current as well as D.C. current since it employs no rheostats or resistance banks.

Yet another object is to provide a speed control system for a rotating wheel in which any electrical failure either shuts down operation of the wheel or keeps the speed of the wheel within safe operating limits, thus providing a fail safe system.

Other objects and advantages of the invention will become apparent from the following description of the invention.

The invention is illustrated more or less diagrammatically in the accompanying drawing wherein the figure shows an exemplary, schematic, electrical circuit for controlling the peripheral speed of cut off wheels of different diameters.

A wheel assembly is indicated generally at 10. The assembly includes an abrasive cut off wheel 11, which is secured to rotating shaft 12 by any suitable means such as a wedge type connector 13. The wheel is driven from a motor 14 whose output shaft 15 drives the wheel shaft 12 by any suitable power transmitting means 16, such as a V belt.

The driving wheel rotates within a wheel guard 17 which closely overlies the wheel 11. The guard is secured by any suitable means 18 to the frame 19.

Motor 14 is connected to a suitable source of power 20 by a pair of circuits which will now be described. The motor itself for example may be a two speed 110 volt 60 cycle single phase motor. For convenience the speeds will be referred to as lo speed and hi speed, the hi speed being such that when the small wheel 11 is driven at the motor's hi speed, the peripheral speed of the wheel will be within the maximum safe speed for the wheel.

The lo speed circuit through the motor includes line $L_1$ which extends from the source to a line 22. Fuse 23 and on-off switch 24 are located in line $L_1$. Line 22 is connected to selector switch 25, which is shown closed against contact 26. Line 27 completes the circuit to the lo speed terminal of motor 14.

The common side of the motor is connected by line 28, safety switch 29, and line 30, to power line $L_2$.

The hi speed motor circuit includes line $L_1$, line 22, selector switch 25, a contact 31 and line 32 which is connected to the hi speed terminal of motor 14.

Safety switch 29 is closed only when control circuit 32 is energized. Control circuit 32 includes low voltage output coil 33 of a transformer 34, the input side 35 of which is connected to power lines $L_1$, $L_2$. Output coil 33 is connected to a guard switch 36 which is normally open but which is closed whenever either a large or a small wheel guard is in place as shown in the figure.

The guard switch 36 and line 37 connect relay coil 38 to transformer 34 through line 39.

Thus, when the on-off switch 24 is closed and transformer 34 energized, the relay coil 38 will be energized if guard switch 36 is closed by any or either wheel guard. Energization of the relay coil 38 closes the normally open safety switch 29.

A motor speed selector circuit is indicated generally at 40. The selector circuit includes a line 41 connected to the output side of transformer 34 and to the speed selector switch relay coil 42. A normally open hi-speed switch 43 in line 41 is so arranged as to be closed only when the small wheel guard 17 is in place. The circuit through the speed selector switch relay coil 42 is completed by lines 44 and 39.

The use and operation of my invention is as follows: Assume that a wheel 11a, which may for purposes of illustration be a thin abrasive cut-off wheel, has just been installed. The wheel rotates in a large size wheel guard 17a. Normally open guard switch 36 is so located that the wheel guard 17a will close guard switch 36, thus completing the control circuit 32. As soon as on-off switch 24 is closed, relay coil 38 is energized which closes normally open safety switch 29. Since selector switch 25 is closed against contact 26, the lo speed circuit through the motor will operate at low speed because wheel guard 17a positively locks out hi speed switch 43 by moving it into the dotted line open position.

After the wheel has worn to the point where the optimum cutting speed is no longer obtained, the large wheel guard 17a is removed and the small wheel guard 17 is placed over the worn-down wheel. The small guard moves guard switch 36 against its contact, thus completing a circuit thru the safety switch relay coil 38. Safety switch 29 is thereby closed and lines 28, 29 and 30 completed. Wheel guard 17 contacts hi speed switch 43 and pushes it into contacts with its contact in line 41. This completes the circuit 33, 41, 43, 44, 39 energizing the speed selector switch relay coil 42. Energization of relay coil 42 moves selector switch 25 into engagement with contact 31, thus completing the hi speed circuit. When the off-on switch 24 is actuated the motor drives the wheel shaft 12 at hi speed.

It should also be noted that should a failure occur in the circuitry, either in the main line or the control circuit such as an open from a broken wire, the wheel either will stop due to loss of power or drop to a lo speed. In other words, it will fail safe. Thus, assuming the motor to be running at hi speed, should a break occur in the selector circuit 40 for example speed selector switch relay coil 42 will be de-energized and selector switch 25 will snap to its solid line position in the figure thus slowing the wheel to lo speed. If a failure occurs in either circuit 32 or the main circuits through the motor, the motor will stop.

Although a preferred embodiment of the invention has been illustrated and described, it will be apparent to one skilled in the art that other variations may be made within the spirit and scope of my invention. Accordingly it is my intention that the scope of my invention should be limited not by the foregoing exemplary description, but only by the scope of the following appended claims when interpreted in light of the pertinent prior art.

I claim:

1. A control system for maintaining the peripheral speed of a shaft mounted, thin, abrasive cut-off wheel at or below a pre-determined maximum, said system including, in combination,
   a source of electric power,
   an electric motor adapted for connection to a cut off wheel shaft in driving engagement therewith,
   a hi speed circuit between the power source and the motor,
   a lo speed circuit between the power source and the motor, said circuits having a common line between the motor and the source,
   a control circuit,
   said control circuit including a relay coil which, when energized, closes a switch in the common line in the hi and lo speed circuits,
   a normally open wheel guard switch in series with a relay coil, said wheel guard switch being closable only upon physical contact with a wheel guard,
   said relay coil and wheel guard switch being connected in series with a transformer, the input side of which is connected to the power source, and
   a selector circuit, said selector circuit including
   a relay coil which controls a switch common to the hi and lo speed motor circuit,
   a switch in series with the relay coil, said switch being closable only in response to the presence of a small size wheel guard, said switch being in series with the selector circuit relay coil, and
   the selector circuit relay coil and switch being in series with the output side of a transformer, the input side being connected to the source of power,
   said common selector switch being normally biased to a position in which it completes the lo speed circuit,
   said selector switch relay coil, when energized, being effective to disconnect the lo speed motor circuit and complete the hi speed motor circuit.

2. A control system for maintaining the peripheral speed of a rotating abrasive cut off wheel below a pre-determined maximum speed limit, said system including, in combination,
   a hi speed circuit, said hi speed circuit, when energized, being effective to run a motor in the circuit at a pre-determined maximum speed,
   said motor being adapted for connection to a cut off wheel shaft in driving engagement therewith,
   a lo speed circuit, said lo speed circuit, when energized, being effective to run the motor at a lower speed,
   first switch means in each circuit closable only in response to the physical presence of a wheel guard of any size,
   said first switch means, when open, being effective to open both circuits, and
   second switch means associated with the hi speed circuit,
   said second switch means being effective, when closed, to energize the hi speed circuit,
   said second switch means being closable only in response to the physical presence of a small sized wheel guard.

3. The system of claim 2 further including means for controlling operation of the first and second switch means,
   said control means including a primary control circuit having a primary sensing switch closable only in response to physical contact with a wheel guard of any size,
   said primary sensing switch, when closed, being effective to complete the primary control circuit and thereby close the first switch means.

4. The system of claim 3 further characterized in that the primary control circuit is energizable only upon connection of the hi and lo speed circuits to a source of power.

5. The system of claim 3 further characterized in that the control means further includes a secondary control circuit having a secondary sensing switch closable only in response to physical contact with a wheel guard of small size,
   said secondary control circuit, when completed, being effective to close the second switch means and thereby complete the hi speed motor circuit.

6. The system of claim 5 further characterized in that the secondary control circuit is energizable only upon connection of the hi and lo speed motor circuits to a source of power.

7. The system of claim 2 further characterized in that the first switch means is a single switch common to both the low and hi speed circuits.

8. The system of claim 2 further characterized in that the second switch means is a single switch common to both the lo and hi speed circuits.

9. A control system for maintaining the peripheral speed of an abrasive cut off wheel at or below a predetermined maximum speed, said control system including a first and a second wheel guard, the first wheel guard being smaller than the second wheel guard, a motor adapted to be connected in driving engagement to a cut off wheel, first circuit means for causing the motor to operate at high speed, said first circuit means including means for physically sensing the presence of the small wheel guard and energizing the high speed circuit in response to the physically sensed presence of the first wheel guard, and second cicruit means for causing the motor to operate at low speed, said second circuit means including means for physically sensing the presence of the second wheel guard, energizing the low speed circuit in response to the physically sensed presence of the second wheel guard, and locking out operation of the high speed circuit.

References Cited by the Examiner

UNITED STATES PATENTS

| | | | |
|---|---|---|---|
| 766,229 | 8/1904 | Douglas | 51—134.5 |
| 1,550,712 | 8/1925 | Smith | 51—134.5 X |
| 1,811,873 | 6/1931 | Belden et al. | 51—134.5 |
| 2,994,994 | 8/1961 | Lonaberger | 51—134.5 |
| 3,113,405 | 12/1963 | Schneider et al. | 51—134.5 |

LESTER M. SWINGLE, *Primary Examiner.*